(12) United States Patent
Harrison et al.

(10) Patent No.: US 10,992,776 B2
(45) Date of Patent: Apr. 27, 2021

US010992776B2

(54) SYSTEM FOR OFFLINE PROCESSING OF ORGANIZATIONAL NETWORKS

(71) Applicant: Microsoft Technology Licensing, LLC, Redmond, WA (US)

(72) Inventors: Aaron James Harrison, Bellevue, WA (US); Amol Dattatray Dhaygude, Redmond, WA (US); Amit Prem Manghani, Alameda, CA (US); Neha Shah, New York, NY (US); Tannaz Sattari Tabrizi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/554,131

(22) Filed: Aug. 28, 2019

(65) Prior Publication Data

US 2020/0412831 A1 Dec. 31, 2020

Related U.S. Application Data

(60) Provisional application No. 62/868,678, filed on Jun. 28, 2019.

(51) Int. Cl.
| | | |
|---|---|---|
| *G06F 3/048* | (2013.01) |
| *H04L 29/08* | (2006.01) |
| *H04L 12/24* | (2006.01) |
| *G06F 16/16* | (2019.01) |
| *H04L 12/26* | (2006.01) |

(52) U.S. Cl.
CPC .............. *H04L 67/32* (2013.01); *G06F 3/048* (2013.01); *G06F 16/168* (2019.01); *H04L 29/08675* (2013.01); *H04L 41/22* (2013.01); *H04L 43/045* (2013.01)

(58) Field of Classification Search
CPC ..... H04L 67/32; H04L 29/08675; H04L 41/22; H04L 43/045; G06F 16/168; G06F 3/048
USPC ......................................................... 715/736
See application file for complete search history.

(56) References Cited

U.S. PATENT DOCUMENTS

| | | | |
|---|---|---|---|
| 9,111,241 B2 * | 8/2015 | Soundararajan | ........ H04L 43/08 |
| 9,137,367 B1 * | 9/2015 | Roberts | ............ G06Q 10/06393 |
| 9,503,452 B1 * | 11/2016 | Kumar | .................. H04L 67/306 |
| 9,729,493 B1 * | 8/2017 | Soundararajan | ........ H04L 67/22 |

(Continued)

OTHER PUBLICATIONS

"International Search Report and Written Opinion Issued in PCT Application No. PCT/US2020/031969", dated Jul. 30, 2020, 11 Pages.

*Primary Examiner* — David Phantana-angkool
(74) *Attorney, Agent, or Firm* — Schwegman Lundberg & Woessner, P.A.

(57) ABSTRACT

A method may include presenting a graphical user interface (GUI) configured to define a network for analysis, the GUI including: a first portion configured to define a network boundary of an organizational network graph (ONG) in a dataset; a second portion configured to define a beginning time and ending time for the network analysis; and a third portion configured to define a set of one or more graph metrics for vertices in the ONG; retrieving a portion of the dataset based on the network boundary, beginning time, and ending time; transmitting instructions to a distributed computing platform to generate the set of graph metrics on the portion of the dataset; and storing the generated set of graph metrics as associated with the network analysis.

20 Claims, 16 Drawing Sheets

(56) References Cited

U.S. PATENT DOCUMENTS

| | | | | |
|---|---|---|---|---|
| 9,734,323 | B2* | 8/2017 | Banatwala | H04L 63/104 |
| 9,887,951 | B2* | 2/2018 | Soundararajan | H04L 51/32 |
| 9,923,859 | B1* | 3/2018 | Soundararajan | H04L 51/32 |
| 9,929,998 | B1* | 3/2018 | Soundararajan | H04L 41/044 |
| D847,825 | S * | 5/2019 | Coren | D14/485 |
| 10,547,521 | B1* | 1/2020 | Roy | H04L 43/06 |
| 10,687,180 | B2* | 6/2020 | Elango | H04W 4/21 |
| 10,699,226 | B1* | 6/2020 | Lyons | G06Q 10/063114 |
| 2013/0311222 | A1 | 11/2013 | Chaturvedi et al. | |
| 2014/0325363 | A1* | 10/2014 | Fletcher | H01L 41/22 |
| | | | | 715/736 |
| 2015/0052443 | A1* | 2/2015 | Funase | G06F 3/0484 |
| | | | | 715/736 |
| 2015/0081701 | A1* | 3/2015 | Lerios | H04L 43/045 |
| | | | | 707/736 |
| 2018/0091392 | A1* | 3/2018 | Richards | H04L 43/08 |
| 2018/0109429 | A1* | 4/2018 | Gupta | G06F 3/0481 |
| 2018/0136798 | A1* | 5/2018 | Aggour | H04L 43/062 |
| 2018/0359219 | A1* | 12/2018 | Israel | H04L 63/065 |

* cited by examiner

WELCOME TO ORGANIZATIONAL NETWORK ANALYSIS

ORGANIZATIONAL NETWORK ANALYSIS IS A METHOD FOR STUDYING COMMUNICATION NETWORKS WITHIN AN ORGANIZATION. VISUALIZING AND ANALYZING FORMAL AND INFORMAL RELATIONSHIPS IN YOUR ORGANIZATION CAN HELP YOU SHAPE BUSINESS STRATEGY THAT MAXIMIZES ORGANIC EXCHANGE OF INFORMATION, THEREBY HELPING YOUR BUSINESS BECOME MORE SUSTAINABLE AND EFFECTIVE.

| NAME | SOURCE | SUBMITTED | SUBMITTER | STATUS |
|------|--------|-----------|-----------|--------|

ADD NEW ANALYSIS — 202

FIG. 2

WELCOME TO ORGANIZATIONAL NETWORK ANALYSIS

ORGANIZATIONAL NETWORK ANALYSIS IS A METHOD FOR STUDYING COMMUNICATION NETWORKS WITHIN AN ORGANIZATION. VISUALIZING AND ANALYZING FORMAL AND INFORMAL RELATIONSHIPS IN YOUR ORGANIZATION CAN HELP YOU SHAPE BUSINESS STRATEGY THAT MAXIMIZES ORGANIC EXCHANGE OF INFORMATION, THEREBY HELPING YOUR BUSINESS BECOME MORE SUSTAINABLE AND EFFECTIVE.

NAME    SOU[R]

DEFINE ANALYSIS SETTINGS  ✕

WHICH TYPE OF INTERACTIONS WOULD YOU LIKE TO INCLUDE IN THE NETWORK?

☑ EMAIL
☑ MEETING

[ CANCEL ]   [ NEXT ]

STATUS

FIG. 4

WELCOME TO ORGANIZATIONAL NETWORK ANALYSIS

ORGANIZATIONAL NETWORK ANALYSIS IS A METHOD FOR STUDYING COMMUNICATION NETWORKS WITHIN AN ORGANIZATION. VISUALIZING AND ANALYZING FORMAL AND INFORMAL RELATIONSHIPS IN YOUR ORGANIZATION CAN HELP YOU SHAPE BUSINESS STRATEGY THAT MAXIMIZES ORGANIC EXCHANGE OF INFORMATION, THEREBY HELPING YOUR BUSINESS BECOME MORE SUSTAINABLE AND EFFECTIVE.

NAME      SO                                    TATUS

DEFINE ANALYSIS SETTINGS

SPECIFY MEETING INTERACTION THRESHOLDS

MAX DURATION THRESHOLD OF EACH INTERACTION: 8HRS

MAX # OF MEMBERS INVOLVED IN EACH INTERACTION: 5

MIN # OF INTERACTIONS: 2

[CANCEL] [NEXT]

FIG. 5

WELCOME TO ORGANIZATIONAL NETWORK ANALYSIS

ORGANIZATIONAL NETWORK ANALYSIS IS A METHOD FOR STUDYING COMMUNICATION NETWORKS WITHIN AN ORGANIZATION. VISUALIZING AND ANALYZING FORMAL AND INFORMAL RELATIONSHIPS IN YOUR ORGANIZATION CAN HELP YOU SHAPE BUSINESS STRATEGY THAT MAXIMIZES ORGANIC EXCHANGE OF INFORMATION, THEREBY HELPING YOUR BUSINESS BECOME MORE SUSTAINABLE AND EFFECTIVE.

NAME  SOU...  ...ATUS

DEFINE ANALYSIS SETTINGS

SPECIFY EMAIL INTERACTION THRESHOLDS

MAX # OF MEMBERS INVOLVED IN EACH INTERACTION: 5

MIN # OF INTERACTIONS: 2

CANCEL     NEXT

FIG. 7

WELCOME TO ORGANIZATIONAL NETWORK ANALYSIS

ORGANIZATIONAL NETWORK ANALYSIS IS A METHOD FOR STUDYING COMMUNICATION NETWORKS WITHIN AN ORGANIZATION. VISUALIZING AND ANALYZING FORMAL AND INFORMAL RELATIONSHIPS IN YOUR ORGANIZATION CAN HELP YOU SHAPE BUSINESS STRATEGY THAT MAXIMIZES ORGANIC EXCHANGE OF INFORMATION, THEREBY HELPING YOUR BUSINESS BECOME MORE SUSTAINABLE AND EFFECTIVE.

| NAME | SOURCE | SUBMITTED | SUBMITTER | STATUS |
|---|---|---|---|---|
| HRBI EXCELLENCE | HRBI-2019-01-12 | 2019-06-19 | PERSON@ABC.COM | DONE |

FIG. 8

NETWORK ANALYSES

SPECIFY ANALYSIS NAME

⊕ ADD A NEW ANALYSIS

[ RENDER GRAPH ]

DEFINE ANALYSIS SETTINGS

ANALYSIS NAME

PERRY'S ORG

SPECIFY THE TIME RANGE FOR ANALYSIS

START MONTH          END MONTH

JAN 2019             MAR 2019

☑ GENERATE MONTHLY METRICS FILE

FIG. 10

WELCOME TO ORGANIZATIONAL NETWORK ANALYSIS

ORGANIZATIONAL NETWORK ANALYSIS IS A METHOD FOR STUDYING COMMUNICATION NETWORKS WITHIN AN ORGANIZATION. VISUALIZING AND ANALYZING FORMAL AND INFORMAL RELATIONSHIPS IN YOUR ORGANIZATION CAN HELP YOU SHAPE BUSINESS STRATEGY THAT MAXIMIZES ORGANIC EXCHANGE OF INFORMATION, THEREBY HELPING YOUR BUSINESS BECOME MORE SUSTAINABLE AND EFFECTIVE.

| NAME | SOURCE | SUBMITTED | SUBMITTER | STATUS |
|---|---|---|---|---|
| HRBI EXCELLENCE | HRBI-2019-01-12 | 2019-06-19 | PERSON@ABC.COM | DONE |
| PERRY'S ORG | HRBI-2019-01-12 | 2019-06-19 | PERSON@ABC.COM | DONE |

FIG. 14

SYSTEM FOR OFFLINE PROCESSING OF ORGANIZATIONAL NETWORKS

RELATED APPLICATIONS

This patent application claims the benefit of priority, under 35 U.S.C. § 119(e), to U.S. Provisional Patent Application Ser. No. 62/868,678, titled SYSTEM FOR OFFLINE PROCESSING OF ORGANIZATIONAL NETWORKS," filed on Jun. 28, 2019, which is incorporated by reference in its entirety

BACKGROUND

Organizational network analysis may involve studying communication networks within an organization. Graphs may be generated based on interactions between users in an organization. Centrality metrics may be calculated for individual users or at a group level.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIGS. 2-14 are user interface diagrams, according to various examples.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device accessible by the component via an Application Programming Interface (API) or other program communication method. Similarly, the variables may be assumed to have default values should a specific value not be described. User interfaces may be provided for an end-user or administrator to edit the variable values in various examples.

Existing organizational network analysis (ONA) tools suffer from a number of problems. First, many of these tools are online and real-time. For example, a user may upload (or otherwise provide access to) their dataset, and then the graph and metrics are generated on the fly. Accordingly, if there are more than a few thousand users the performance of these tools become unusable or impossible. For example, the calculation of certain metrics is memory and processor intensive, and the resources of a browser-based system are simply insufficient to handle 10,000+ user network-especially when performed in serial. Network metrics should be computed in a reasonable amount of time for large networks in order to decrease cost to the customer and computational wait times. Second, many organizations (as well as countries) have privacy restrictions that would not permit sharing of user data.

In view of the above problems, a system is described herein that allows generating and analyzing organizational networks on a scale not possible with existing systems. To this end, the system makes use of distributing computing platforms to perform ONA offline (e.g., not in real time) using parallelization optimized variants of graph metrics. In addition to being able to analyze larger organizations, the system permits multiple different analysis for different time periods-allowing to see organizational change over time. Finally, the described system may leverage organizational data that exists within the computing system and that which generates the metrics. Thus, privacy or regulatory concerns with transmitting data to other ONA tools may be alleviated.

Figure 1:
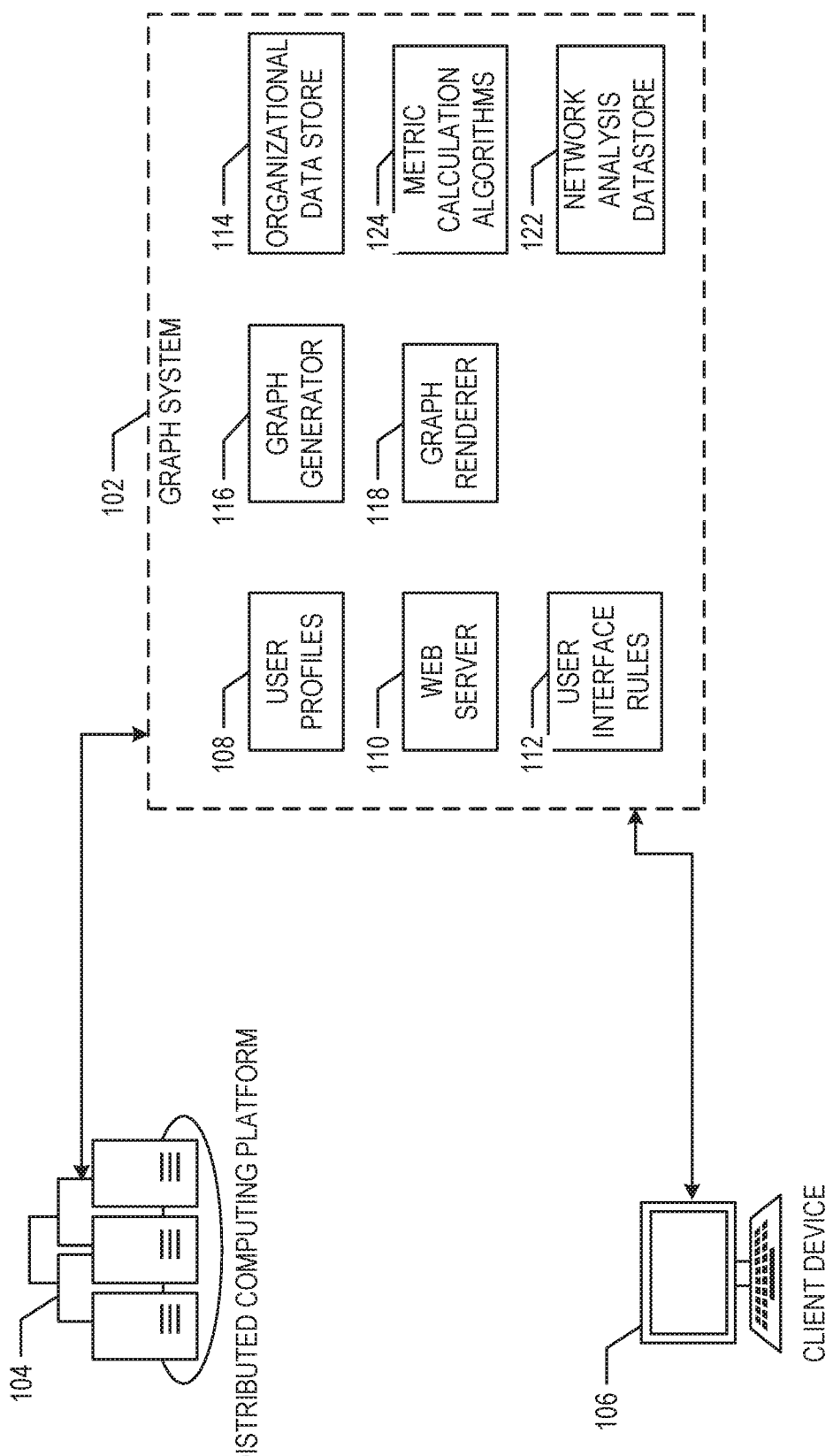
FIG. 1 is a diagram illustrating a system for generating an organizational network analysis, according to various examples.

FIG. 1 is a diagram illustrating a system for generating an organizational network analysis. The diagram includes graph system 102, distributed computing platform 104, and client device 106. Graph system 102 may include user profiles 108, web server 110, user interface rules 112, organizational data store 114, graph generator 116, graph renderer 118, network analysis datastore 122, and metric calculation algorithms 124.

Client device 106 may be, but is not limited to, a smartphone, tablet, laptop, multi-processor system, microprocessor-based or programmable consumer electronics, game console, set-top box, or any other device that a user utilizes to communicate over a network with graph system 102. In an example, client device 106 includes a display module (not shown) to display information (e.g., in the form of specially configured user interfaces) provided by graph system 102 via web server 110. In some embodiments, client device 106 may include one or more of a touch screen, camera, keyboard, microphone, and Global Positioning System (GPS) device.

Distributed computing platform 104 may be a group of processing units (e.g., a core of a general-purpose computer processor, a graphical processing unit, an application specific integrated circuit, etc.) that execute a task in a collaborative or parallel manner. For example, distributed computing platform 104 may be configured using a distributed computing platform such as APACHE SPARK, that may distribute work between the different processing units. Example distributed computing platforms may be MICROSOFT AZURE®, AMAZON WEB SERVICES®, and the GOOGLE CLOUD PLATFORM®.

Distributed computing platform 104 may be particularly useful when dealing with large data sets (e.g., millions of data points) where processing a single computer would be unable to process a dataset for time-sensitive tasks. For example, if a user is trying to make a change in a system for the next week based on a dataset analysis—but the processing would take at least that long-a single computer could not be used.

For illustration purposes, graph system 102 is illustrated as set of separate functional units (e.g., graph generator 116, graph renderer 118, web server 110, metric calculation algorithms 124, etc.). However, the functionality of multiple functional units may be performed by a single unit. A functional unit may represent computer program code that is executable by a processing unit (e.g., one or more cores of a general-purpose computer processor, a graphical processing unit, an application specific integrated circuit, etc.). The program code may be stored on a storage device and loaded into a memory of the processing unit for execution. Portions of the program code may be executed in a parallel across multiple processing units. Execution of the code may be performed on a single device or distributed across multiple devices (e.g., using distributed computing platform 104).

Similarly, multiple datasets are illustrated (e.g., user profiles 108, user interface rules 112, organizational data store 114, network analysis datastore 122, etc.). The datasets, however, may be part stored in single database. The data may be organized and stored in a variety of manners. For convenience, the organized collection of data is often described in the context of a database(s) with tables (not illustrated in FIG. 1). The specific storage layout and model used in a database may take a number of forms-indeed, a database may utilize multiple models. The database may be, but is not limited to, a relational database (e.g., SQL), non-relational database (NoSQL) a flat file database, object model, document details model, graph database, shared ledger (e.g., blockchain), or a file system hierarchy. The database may store data on one or more storage devices (e.g., a hard disk, random access memory (RAM), etc.). The storage devices may be in standalone arrays, part of one or more servers, and may be located in one or more geographic areas.

In various examples, the assets and components in FIG. 1 may communicate via one or more networks (not illustrated). A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth), Wi-Fi Direct), or other combinations or permutations of network protocols and network types. A network may include a single local area network (LAN) or wide-area network (WAN), or combinations of LAN's or WAN's, such as the Internet.

User profiles 108 may include data on users that use graph system 102. The data may include what organizational data (e.g., from organizational data store 114) a user is permitted to access. The data may identify previously identified datasets and completed network analyses (e.g., from network analysis datastore 122) on those datasets. For example, a user may log in to graph system 102 using a set of credentials. Graph system 102 may access user profiles 108 to retrieve the completed network analyses and present them to the user. The user may then download metrics associated with the network analyses or render a graph based on the analyses.

Organizational data store 114 may store information on an organization (e.g., a company or group of users). The information may include e-mail data, calendar data, message interactions, etc. Each type of information may include metadata in a standardized format. For example, an e-mail message may include a date, a sender, and one or more recipients. A calendar appointment may include a duration, date, and an attendee list. Messaging application messages (e.g., chat application, text messages) may include a sender and recipient.

Users in organizational data store 114 may also be associated with one or more attributes (e.g., title, geographical location, job function, etc.)

Web server 110 and user interface rules 112 may be used in combination to present a series of user interfaces to a user for identifying a dataset and then initiating a network analysis on all or part of the dataset.

Web server 110 may be used to exchange information with users via a network such as the Internet. Although generally discussed in the context of delivering webpages via the Hypertext Transfer Protocol (HTTP), other network protocols may be utilized by web servers 110 (e.g., File Transfer Protocol, Telnet, Secure Shell, etc.) A user may enter in a uniform resource identifier (URI) into a network browser (e.g., the INTERNET EXPLORER® web browser by Microsoft Corporation or SAFARI® web browser by Apple Inc.) that corresponds to the logical location (e.g., an Internet Protocol address) of web server 110. In response, web server 110 may transmit a web page that is rendered on a display device of client device 106.

Web server 110 may enable a user to interact with one or more web applications provided in a transmitted one or more web pages. A web application may provide user interface (UI) components that are rendered on a display device of a computing device. The user may interact (e.g., select, move, enter text into) with the UI components, and, based on the interaction, the web application may update one or more portions of the web page. A web application may be executed in whole, or in part, locally on a client device.

The web application may populate the UI components with data from external sources or web server in various examples. The web application may issue API calls to retrieve the data. Conversely, data entered by a user into a UI component may be transmitted using an API call back to the web server. In various examples, user interface rules 112 defines the web application. A more thorough example of user interface rules 112 is presented in the context of FIGS. 2-14.

Graph generator 116 may store a graph data structure based on data in organizational data store 114 and settings of a user. The graph data structure may be an organization or social network graph based on interactions between users that part of the network. For example, each vertex in the graph may represent a person and the edges represent an interaction. Thus, if Amy emails Robert, an edge may be generated between the Amy vertex and the Robert vertex. Weights of the edges may be based on the volume of interactions in some examples (e.g., more weight for more interactions). The vertices may also have metric data associated with them after metric calculation algorithms 124 have been performed. The metrics may also be stored in network analysis datastore 122.

Graph renderer 118 may present a representation of the graph data structure generated by graph generator 116. For example, each vertex may be represented as a circle and the edges as lines between the circles. Different view of the graph may be used such as changing the size of a circle based on an underlying metric value or changing color based on some underlying attribute of the user (e.g., which department the user is a part of). Different visualization methodologies may be used without departing from the scope of this disclosure.

FIGS. 2-14 are user interface diagrams, according to various examples. Each presented user interface may be considered a user interface portion, according to various examples. A user interface portion may be configured to define data by displaying one or more input user interface elements. For example, a drop-down menu or a set of selected radio buttons may be presented with identifiers of available datasets. In an example, a text input box may be presented to receive the identification of a dataset from a user directly- or use a search query to find a dataset.

The GUI is described as a series of interface portions. A first portion may be displayed simultaneously with one of more other portions. In various examples, the portions may be displayed sequentially (e.g., as a series of webpages). In various examples, a portion may be presented as an overlay or pop-up window that partially or completed obscures another portion. Additionally, although the ordinal labels are sometimes used for the user interface portions (e.g., first, second, third portions), this is for discussion purposes and should not imply an absolute ordering.

A GUI may be configured to define a network for analysis in various examples. A configuration of a GUI may include a definition (e.g., user interface rules 112) of where to present user interface elements in either absolute or relative terms. For example, a GUI may be a webpage defined in HTML. Presenting may include transmitting a webpage for rendering on a display device of a computing device that receives the webpage FIG. 2 is diagram illustrating user interface 200, according to various examples. User interface 200 may be presented to a user after logging into graph system 102. As illustrated, no analysis has been defined yet for the user. A user may select user interface element 202 to define settings for a new analysis.

Figure 3:
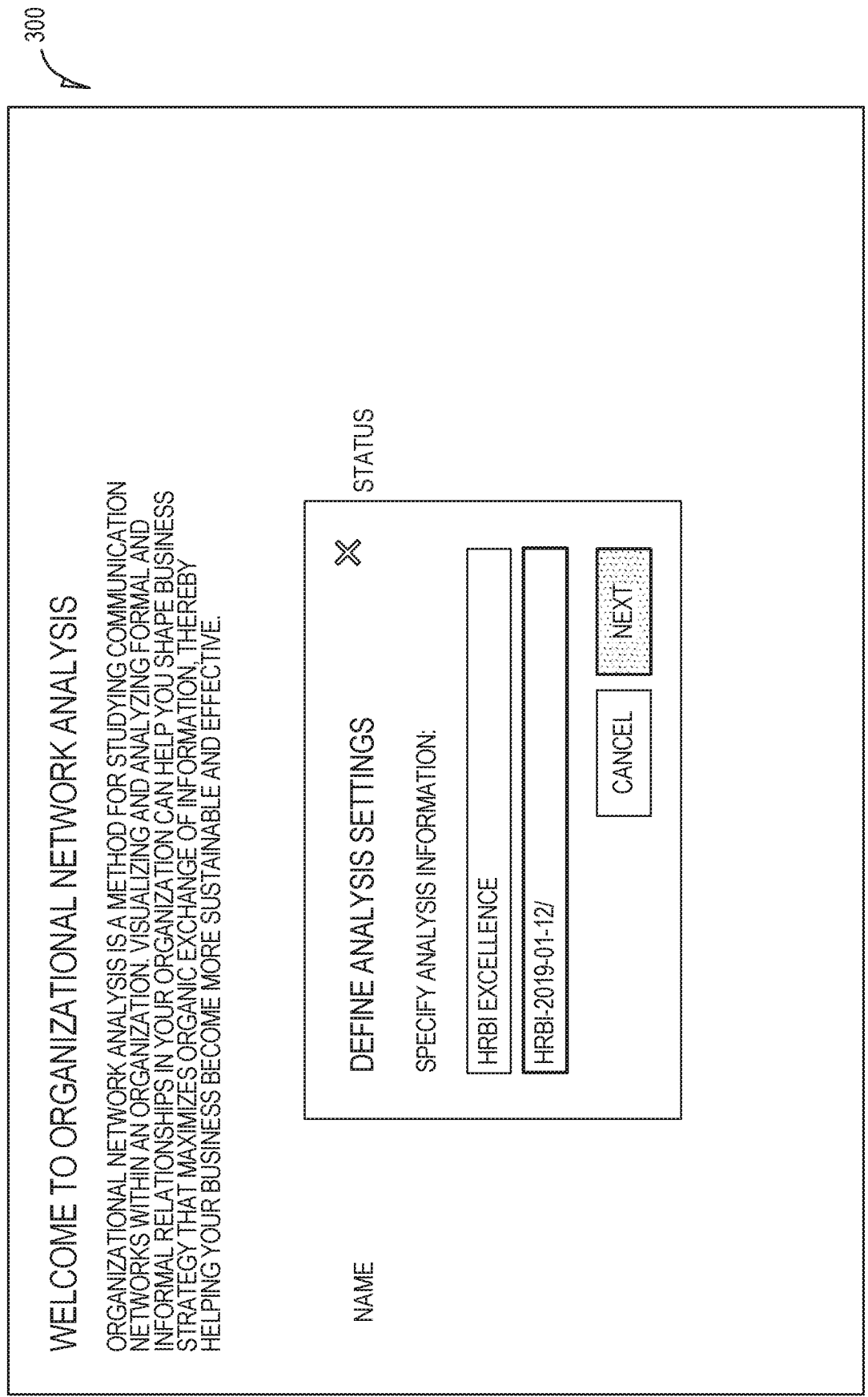

FIG. 3 is diagram illustrating user interface 300, according to various examples. User interface 300 may be presented after selection of user interface element 202 in various examples. User interface 300 may request the user enter a name for the analysis and a path to a data source (e.g., organizational data store 114). In various examples, a drop-down menu of possible data sources is presented to the user.

FIG. 4 is diagram illustrating user interface 400, according to various examples. User interface 400 may be presented after user interface 300. Graph system 102 may determine what types of interactions are in the data source indicated in user interface 300 and present options to include one or more interaction types in an analysis. In this instance, e-mail and meeting data may be included. Other types of interactions may be indicated without departing from the scope of this disclosure.

Figure 6:
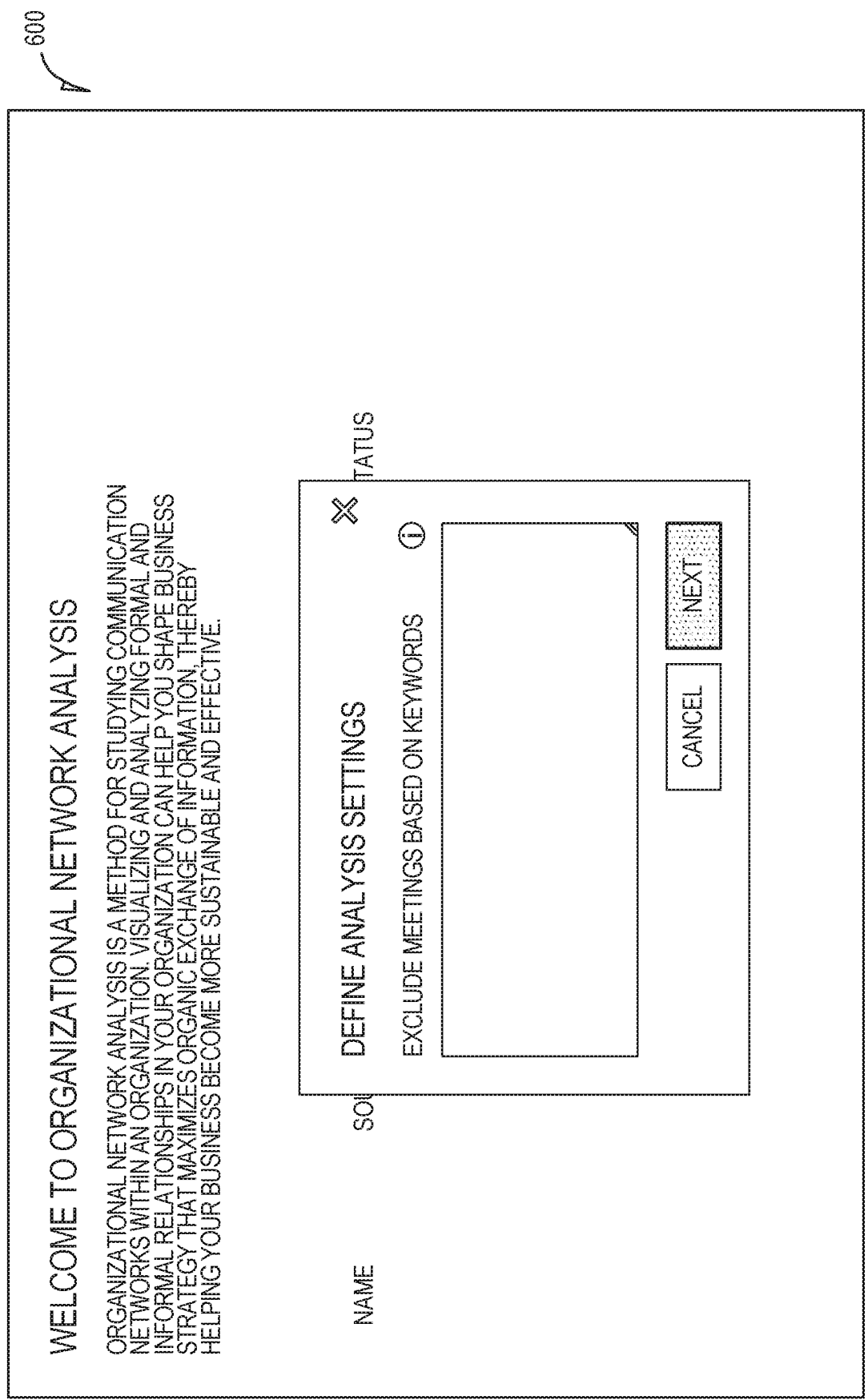

FIG. 5 and FIG. 6 are diagrams illustrating user interfaces 500 and 600, according to various examples. User interfaces 500 and 600 may be presented after user interface 400. Interfaces 500 and 600 may present options for meeting interactions found in the data source. If a meeting does meet the criteria indicated by the user, the meeting may be excluded when an organizational graph is generated.

FIG. 7 is diagram illustrating user interface 700, according to various examples. User interface may be presented after user interface 600. User interface 700 may present options for email interactions found in the data source. If an e-mail does meet the criteria indicated by the user, the e-mail may be excluded when an organizational graph is generated. Although not illustrated, if other interaction types were indicated in FIG. 4, options related to those interaction types may be presented as well. User interface 700 also illustrates an option to run the analysis.

Furthermore, there may be a set of global threshold settings in addition to type specific criteria. For example, there may be a setting for the maximum number of people in an interaction, a maximum duration of an interaction, a minimum number of interactions, and a rolling week setting, the rolling week setting may be used to inform the other settings. For example, if the rolling week setting is four weeks there may need to be five interactions during those four weeks between two people in order for the interaction to be included.

Running the analysis may include identifying the interactions that meet the criteria indicated by the user and generating a graph therefrom. For example, graph generator 116 may iterate through the identified interactions and create edges between the personnel involved in the interaction. In an example, metrics are not computed at this time.

FIG. 8 is diagram illustrating user interface 80, according to various examples. User interface 800 may be presented after a user clicks "Run" in FIG. 7. As shown, an analysis has been created according to the information entered by the user in FIG. 3.

Although not illustrated, a user may click on the analysis and render the underlying graph (e.g., using graph renderer 118). A user may be able to filter the graph according to attributes of the users included in the graph. For example, a user may be associated with a job function, a managerial level, a geographic location, domain, engagement level, etc. So, a user may be to view all the engineers in California in graph form according to their interactions.

Figure 9:
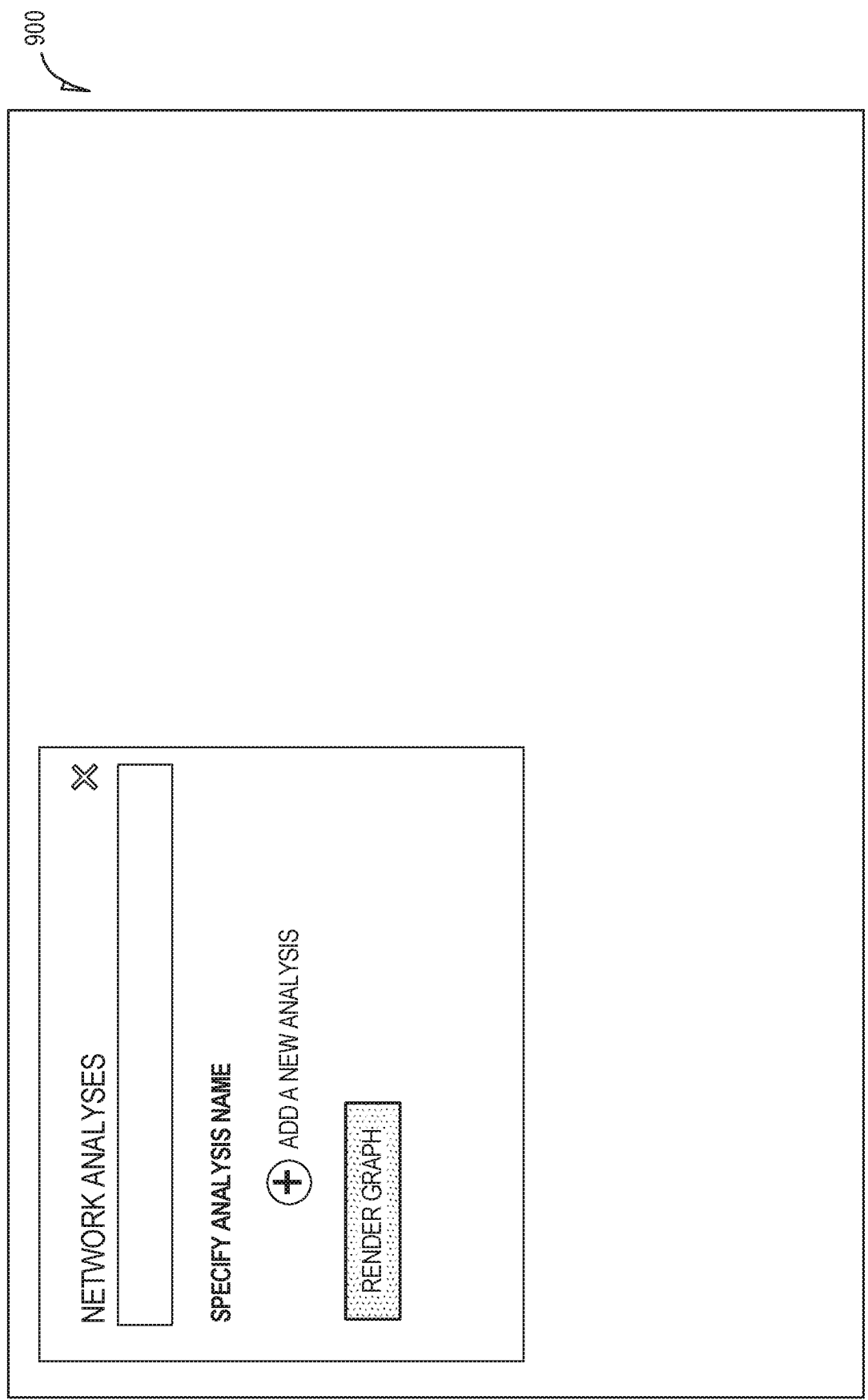

FIG. 9 is diagram illustrating user interface 900, according to various examples. User interface 900 may be presented after a user has defined an interaction data set (e.g., using user interfaces 200-700). As illustrated, no analyses have been created yet. A user may click "add a new analysis" to be taken through a process illustrated in FIGS. 10-14.

FIG. 10 is diagram illustrating user interface 1000, according to various examples. User interface 1000 may present an initial set of setting for an analysis such as a name, a starting time period, and an ending time period. The user may be also be presented with options to generate more than one metric file. For example, in FIG. 10 there is an option to include monthly metrics files, which would result in files for January, February, and March 2019. Other time grouping may be used and presented as options. For example, there may be an option to generate metric files for 3-month, 6-month, 9-month, and year long periods.

Figure 11:
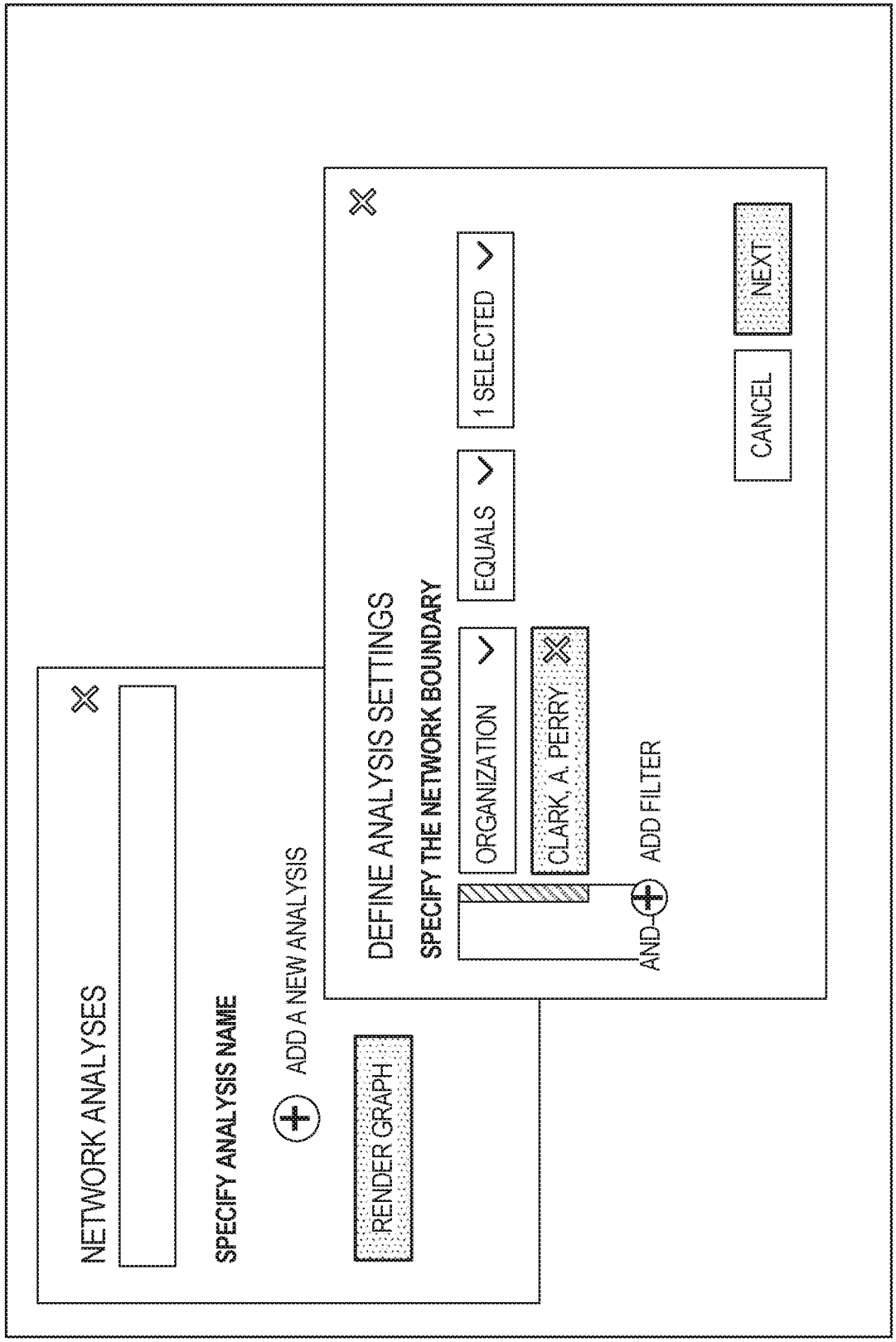

FIG. 11 is diagram illustrating user interface 1100, according to various examples. User interface 1100 may be presented after user interface 1000 in various examples. User interface 1100 may be used to define a network boundary according to attributes of the other underlying data set. For example, in this example, the boundary is set as being when the organization attribute is equal to Perry A. Clarke. More than one filter may be used without departing from the scope of this disclosure.

Figure 12:
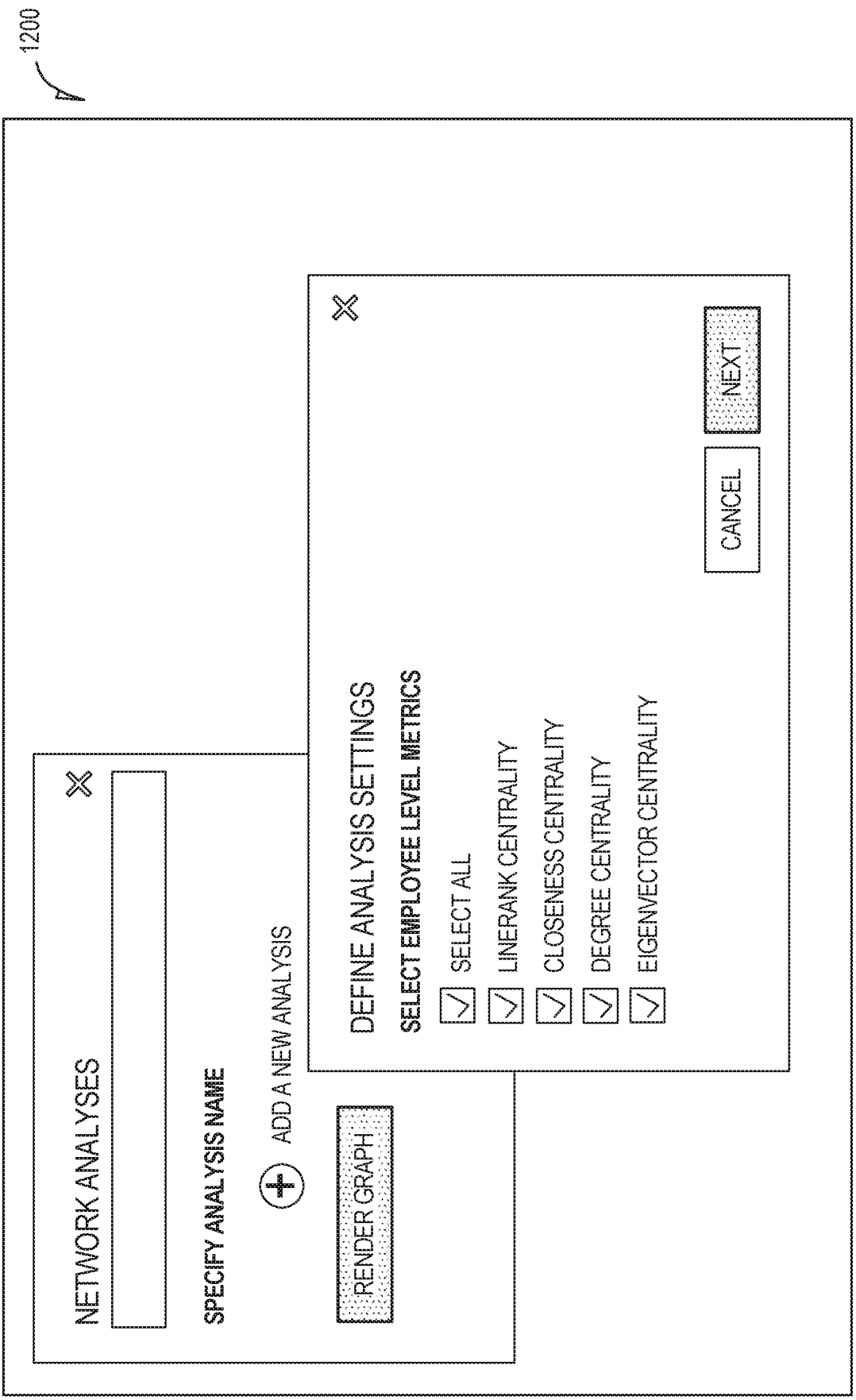

FIG. 12 is diagram illustrating user interface 1200, according to various examples. User interface 1200 may be presented after user interface 1100. User interface 1200 may present options for what metrics to calculate for the users that are part of the filtered network (e.g., as defined by user interface 1100).

Figure 13:
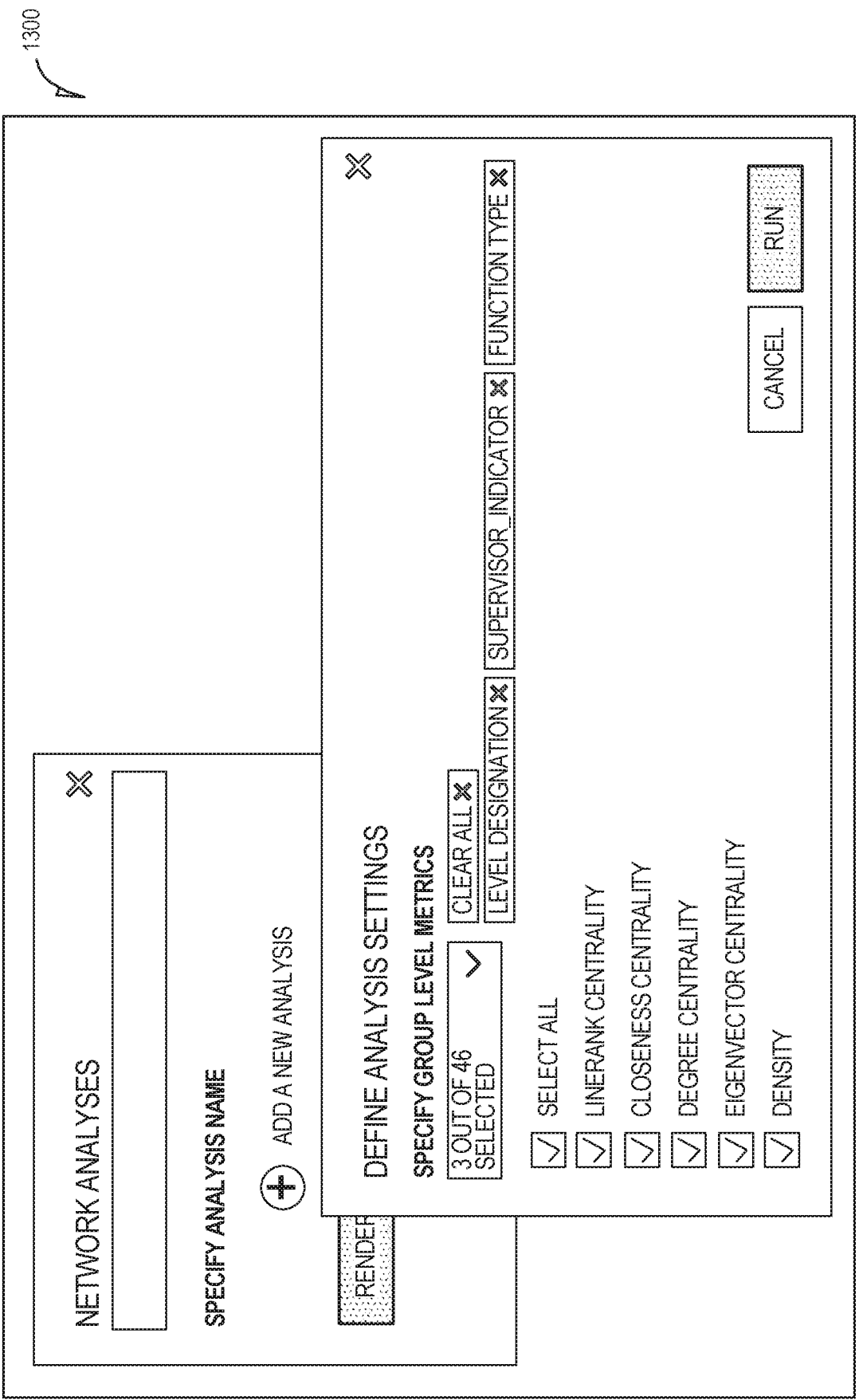

FIG. 13 is diagram illustrating user interface 1300, according to various examples. User interface 1200 may be presented after user interface 1200. User interface 1200 may present options for calculating group level metrics based on underlying attributes of the data set. For example, user interface 1300 shows that three different groups have been identified according to level designation, a supervisor indicator, and a function type (e.g., sales). As with user interface 1200, one or more metrics may be selected for the group's calculations. An option to run the analysis may also be presented.

Although not illustrated, a user may be given an option to create more analyses. This may be useful for when the user wants to compare how an organizational graph has changed over time. For example, one analysis may be for the first quarter of year, and then, after some organizational changes have been made, a second analysis may be run for the second quarter.

FIG. 14 is diagram illustrating user interface 1400, according to various examples. User interface 1400 may be presented after all of the metrics have been run according to the options indicated. As indicated previously, the metric analysis is run offline separate from the graph rendering. Icon 1402 may be selected by a user to download the calculated metrics.

In various examples, a user may select the analysis (e.g., Perry's Org) to render one or more graphs based on the underlying graph structure and calculated metrics. For example, a graph based on calculated eigen centrality may be rendered.

Figure 15:
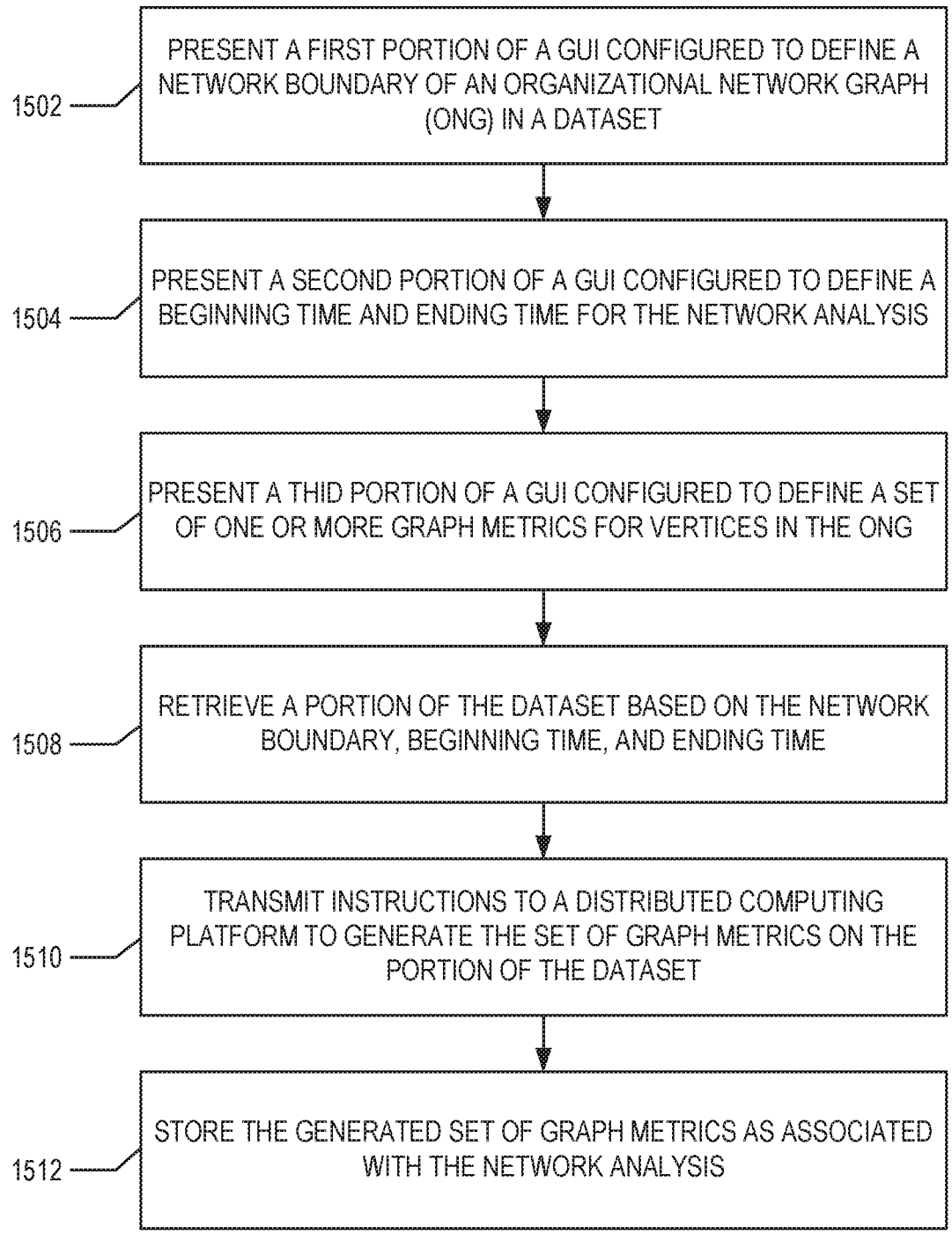
FIG. 15 is a flowchart diagram illustrating a method, according to various examples.

FIG. 15 is a flowchart illustrating a method, according to various examples. The method is represented as a set of blocks that describe operations 1502-1512 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device (s) may have one or more processors that execute the set of instructions to configure the one or more processors to perform the operations illustrated in FIG. 15. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

Some of the operations of the method may not be illustrated in FIG. 15. For example, prior to operation 1502 a user interface portion may be presented to define a set of one or more interaction types between users in an organization to include in an organizational network graph (ONG) (e.g., FIG. 4). A user interface may be considered to define the set of or more interactions by presenting user interface elements for selection by a user. An additional user interface portion may be configured to define interaction criteria (e.g., duration of an interaction) for an interaction type defined in the fourth portion (e.g., FIGS. 5-7).

In various examples, the organizational network graph may be generated based on the interaction criteria. For example, the organizational network graph may represent users within an organization and edges represent an interaction that meets the interaction criteria between users in the organization (see e.g., discussion of graph generator 116) above.

After the ONG has been generated, at operation 1502, a first portion of the user interface (e.g., FIG. 11) may be presented that is configured to define a network boundary of the organizational network graph (ONG) in a dataset. The dataset may have been identified previously and may represent a set of email, calendar, and messaging application data. The network boundary may be one or more filters based on underlying attribute data of users in the ONG. For example, a network boundary may be all users that are engineers.

At operation 1504, a second portion may be presented that is configured to define a beginning time and ending time (e.g., of interactions) for the network analysis. The time may be a day, month, of year, in various examples. The second portion may be a user interface such as presented in FIG. 10).

At operation 1506, a third portion configured to define a set of one or more graph metrics for vertices in the ONG may be presented. For example, one or more centrality metrics may be selected (see e.g., FIG. 12). In various examples, another user interface portion is presented to define a set of groups (e.g., based on attributes) and metric calculations thereto.

Operation 1508, in various examples, may include retrieving a portion of the dataset based on the network boundary, beginning time, and ending time. Retrieving may include identifying and querying the logical locations of the underlying data (e.g., which databases, etc.)

Operation 1510, in various examples, may include transmitting instructions to a distributed computing platform (e.g., distributed computing platform 104) to generate the set of graph metrics on the portion of the dataset offline. In various examples, the instructions may be based on metric calculation algorithms (e.g., metric calculation algorithms 124) optimized for distributed computing platforms. Different algorithms may have been optimized in different manners.

For example, for Closeness and Betweenness Centralities and Network Holes Constraint and Redundancy metrics, the difference in implementation vs. the standard implementation may be that each of the metric calculations is turned into a function and then run in parallel for each person in the network (e.g., using distributed computing platform 104). Other existing implementations run each calculation in serial.

An Interconnectedness or Boundary Spanner metric may be defined as the number of people or amount of time that you as an individual collaborate with those that are outside of your group. The group that is being considered would be an HR attribute such as organization and may be determined by the analyst.

In some examples, a group calculation of a metric may be modified whereas as the individual metric may not be. For example. LineRank Centrality for an individual in a network may be defined as the sum of the importance score of its incident edges. An Edge importance score is the probability that a random walker visiting edges via nodes will stay at the edge (Kang, Papadimitriou, Sun, & Tong, 2011). Based on the principle that a group within an organization is not one entity but a collection of people working together, the LineRank Centrality for a group is defined as the sum of the importance score of the group's incident edges. Additionally, the Edge Importance Score for groups is the probability that a random walker visiting edges outside a group via nodes inside a group will stay at the edge. Hence the LineRank score for a group becomes the sum of the edge importance scores adjacent to the group normalized by the number of people in the group.

In the article "Identifying sets of key players in a social network" by Borgatti, S. P. (Borgatti, 2006), the concept of key reachers is analyzed under KPP-Pos metric. In this concept we are generally looking at connections and cohesion that a group of nodes have with the remainder of network. This article defines a function to measure the amount of cohesion between members of the group and the remainder of nodes within the network. This measure is based on reciprocal of shortest distance between nodes in the group and nodes outside of the group. It is also normalized among all nodes for the ease of interpretation, so that the measure would be between 0 and 1 based on the equation below.

$$D_R = \frac{\sum_j \frac{1}{d_{kj}}}{n}$$

$D_R$ is the weighted proportion of all nodes reached by the set, $d_{kj}$ is the minimum distance from any member of k to node j, and n is the number of nodes in the graph.

In order to use this measure to find the people who affect the cohesion of network mostly, an optimization algorithm is suggested that calculates reach measure for different sets of nodes within the network using the algorithm below.
1. Select k nodes at random to populate set S
2. Set F=fit using appropriate key player metric
3. For each node u in S and each node v not in S
   a. DELTAF=improvement in fit if u and v were swapped
4. Select pair with largest DELTAF
   a. If DELTAF<=then terminate
   b. Else, swap pair with greatest improvement in fit and set F=F+DELTAF
5. Go to step 3

In the process of applying this to networks discussed above, a few changes were needed.
1) In the networks of graph system 102 network edge weights may represent the strength between nodes and not distances. So, in order to have distances that are bigger or equal to 1, the edge weights may be modified. In example, the reciprocal of connection strength normalized by minimum reciprocal of connection strength is used to have the distances in the needed range.
2) Then the whole formula needed may modified as the metric should be calculated over all k members of the network and then normalized accordingly which does not happen in the presented equation. The modified reach measure equation may be defined as below:

$$D_R = \frac{\sum_k \sum_{j=v-k} \frac{1}{d_{kj}}}{k(n-k)}$$

3) Then the optimization algorithm may not be usable as the size of the network grows. So, a more optimal starting point may be needed. For a better starting point the reach degree is calculated for all nodes as groups of single nodes. Then, we expect that a group of high reach single nodes form the group with highest reach. Then, we can swap nodes with other randomly selected high reach nodes and iterate through until we reach our error threshold.
1. Calculate reach measure for all the nodes.
2. Select k nodes from high reach single nodes to populate set S
3. Set F=fit using appropriate key player metric
4. For each node u in S and each node v not in S
   a. DELTAF=improvement in fit if u and v were swapped
5. Select pair with largest DELTAF
   a. If DELTAF<=then terminate
   b. Else, swap pair with greatest improvement in fit and set F=F+DELTAF
6. Go to step 3

Operation 1512, in various examples, may include storing the generated set of graph metrics as associated with the network analysis. Accordingly, when a user logs into a system such as graph system 102, a link may be presented to the metrics. In various examples, if a user selects an identifier of the network analysis (e.g., the name) a visual representation of the network analysis may be presented. For example, each vertex may be presented as a circle (or other shape) connected to other circles.

EXAMPLE COMPUTER SYSTEM

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 16:
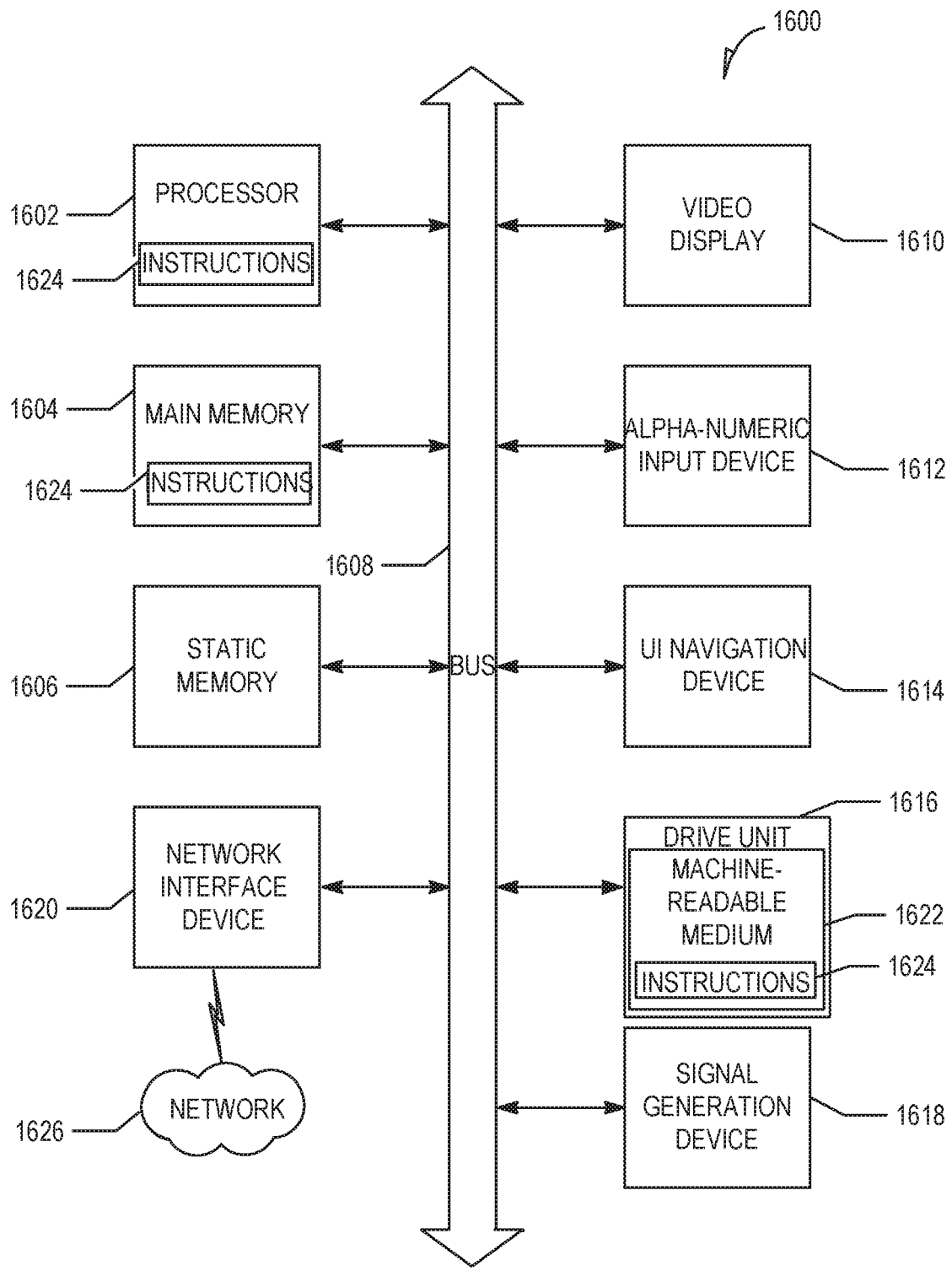
FIG. 16 is a block diagram illustrating an example machine upon which any one or more of the techniques (e.g., methodologies) discussed herein may be performed, according to an example embodiment.

FIG. 16 is a block diagram illustrating a machine in the example form of a computer system 1600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1600 includes at least one processor 1602 (e.g., a central processing unit (CPU), a graphics processing unit (GPU) or both, processor cores, compute nodes, etc.), a main memory 1604 and a static memory 1606, which communicate with each other via a link 1608 (e.g., bus). The computer system 1600 may further include a video display unit 1610, an alphanumeric input device 1612 (e.g., a keyboard), and a user interface (UI) navigation device 1614 (e.g., a mouse). In one embodiment, the video display unit 1610, input device 1612 and UI navigation device 1614 are incorporated into a touch screen display. The computer system 1600 may additionally include a storage device 1616 (e.g., a drive unit), a signal generation device 1618 (e.g., a speaker), a network interface device 1620, and one or more sensors (not shown), such as a global positioning system (GPS) sensor, compass, accelerometer, or other sensor.

The storage device 1616 includes a machine-readable medium 1622 on which is stored one or more sets of data structures and instructions 1624 (e.g., software) embodying or utilized by any one or more of the methodologies or functions described herein. The instructions 1624 may also reside, completely or at least partially, within the main memory 1604, static memory 1606, and/or within the processor 1602 during execution thereof by the computer system 1600, with the main memory 1604, static memory 1606, and the processor 1602 also constituting machine-readable media.

While the machine-readable medium 1622 is illustrated in an example embodiment to be a single medium, the term "machine-readable medium" may include a single medium or multiple media (e.g., a centralized or distributed database, and/or associated caches and servers) that store the one or more instructions 1624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1624 may further be transmitted or received over a communications network 1626 using a transmission medium via the network interface device 1620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

CITATIONS

Borgatti, S. P. (2006). Identifying sets of key players in a social network. *Computational & Mathematical Organization Theory* 21-34.

Kang, U., Papadimitriou, S., Sun, J., & Tong, H. (2011). Centralities in Large Networks: Algorithms and Observations. *Proceedings of the* 2011 *SIAM International Conference on Data Mining,* 10.1137/1.9781611972818.11.

What is claimed is:

1. A system comprising
a processing unit;
a storage device comprising instructions, which when executed by at least one processor, configure the processing unit to perform operations comprising:
  presenting a graphical user interface (GUI) configured to define a network for analysis, the GUI including:
    a first portion configured to define a network boundary of an organizational network graph (ONG) in a dataset, vertices in the ONG representing users within an organization and edges in the ONG representing an electronic interaction between users in the organization;
    a second portion configured to define a beginning time and ending time for the network analysis; and
    a third portion configured to define a set of one or more graph metrics for vertices in the ONG;

retrieving a portion of the dataset based on the network boundary, beginning time, and ending time;

transmitting instructions to a distributed computing platform to generate the set of graph metrics on the portion of the dataset; and storing the generated set of graph metrics as associated with the network analysis.

2. The system of claim 1, wherein the operations further include:

receiving a selection of an identifier of the network analysis; and in response to the selection, presenting a visual representation of the network analysis.

3. The system of claim 1, wherein the electronic interaction between users in the organization comprises an email interaction or a meeting interaction.

4. The system of claim 3, wherein the GUI further includes:

a fourth portion configured to define a set of one or more interaction types between users in the organization to include in the organizational network graph; and a fifth portion configured to define interaction criteria for an interaction type defined in the fourth portion.

5. The system of claim 4, wherein the instructions, which when executed by at least one processor, further configure the processing unit to perform operations:

generating the organizational network graph based on the interaction criteria.

6. The system of claim 1, wherein the set of one or more graph metrics for vertices in the ONG include a centrality measurement.

7. The system of claim 1, wherein the GUI further includes:

a fourth portion configured to define a set of one or more graph metrics for groups within the ONG.

8. A method comprising:

presenting a graphical user interface (GUI) configured to define a network for analysis, the GUI including:

a first portion configured to define a network boundary of an organizational network graph (ONG) in a dataset, vertices in the ONG representing users within an organization and edges in the ONG representing an electronic interaction between users in the organization;

a second portion configured to define a beginning time and ending time for the network analysis; and a third portion configured to define a set of one or more graph metrics for vertices in the ONG;

retrieving a portion of the dataset based on the network boundary, beginning time, and ending time;

transmitting instructions to a distributed computing platform to generate the set of graph metrics on the portion of the dataset; and storing the generated set of graph metrics as associated with the network analysis.

9. The method of claim 8, further including:

receiving a selection of an identifier of the network analysis; and in response to the selection, presenting a visual representation of the network analysis.

10. The method of claim 8, wherein the electronic interaction between users in the organization comprises an email interaction or a meeting interaction.

11. The method of claim 10, wherein the GUI further includes:

a fourth portion configured to define a set of one or more interaction types between users in the organization to include in the organizational network graph; and a fifth portion configured to define interaction criteria for an interaction type defined in the fourth portion.

12. The method of claim 11, further including:

generating the organizational network graph based on the interaction criteria.

13. The method of claim 8, wherein the set of one or more graph metrics for vertices in the ONG include a centrality measurement.

14. The method of claim 8, wherein the GUI further includes:

a fourth portion configured to define a set of one or more graph metrics for groups within the ONG.

15. A storage device comprising instructions, which when executed by a processing unit, configure the processing unit to perform operations comprising:

presenting a graphical user interface (GUI) configured to define a network for analysis, the GUI including:

a first portion configured to define a network boundary of an organizational network graph (ONG) in a dataset, vertices in the ONG representing users within an organization and edges in the ONG representing an electronic interaction between users in the organization;

a second portion configured to define a beginning time and ending time for the network analysis; and a third portion configured to define a set of one or more graph metrics for vertices in the ONG;

retrieving a portion of the dataset based on the network boundary, beginning time, and ending time;

transmitting instructions to a distributed computing platform to generate the set of graph metrics on the portion of the dataset; and storing the generated set of graph metrics as associated with the network analysis.

16. The storage device of claim 15, wherein the operations further include:

receiving a selection of an identifier of the network analysis; and in response to the selection, presenting a visual representation of the network analysis.

17. The storage device of claim 15, wherein the electronic interaction between users in the organization comprises an email interaction or a meeting interaction.

18. The storage device of claim 17, wherein the GUI further includes:

a fourth portion configured to define a set of one or more interaction types between users in the organization to include in the organizational network graph; and a fifth portion configured to define interaction criteria for an interaction type defined in the fourth portion.

19. The storage device of claim 18, wherein operations further include:

generating the organizational network graph based on the interaction criteria.

20. The storage device of claim 15, wherein the set of one or more graph metrics for vertices in the ONG include a centrality measurement.

* * * * *